(12) United States Patent
Salter et al.

(10) Patent No.: US 12,438,365 B2
(45) Date of Patent: Oct. 7, 2025

(54) POWER DISTRIBUTION MANAGEMENT FOR A VEHICLE

(71) Applicant: Ford Global Technologies, LLC, Dearborn, MI (US)

(72) Inventors: Stuart C. Salter, White Lake, MI (US); Jessica Louise Smith, Brighton, MI (US); Roxanne Anthonette Pinheiro, Grosse Ile, MI (US); David Celinske, Wolverine Lake, MI (US); Rudi Todd Ansbacher, Westland, MI (US); Justin Richard Longbourne, Stock (GB)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 18/440,176

(22) Filed: Feb. 13, 2024

(65) Prior Publication Data

US 2025/0260226 A1    Aug. 14, 2025

(51) Int. Cl.
*H02J 1/10* (2006.01)
*B60R 16/033* (2006.01)
*H02J 13/00* (2006.01)

(52) U.S. Cl.
CPC .............. *H02J 1/10* (2013.01); *B60R 16/033* (2013.01); *H02J 13/00001* (2020.01); *H02J 13/00004* (2020.01); *H02J 2310/48* (2020.01); *H02J 2310/60* (2020.01)

(58) Field of Classification Search
CPC .. H02J 1/10; H02J 13/00001; H02J 13/00004; H02J 2310/48; H02J 2310/60; B60R 16/033
See application file for complete search history.

(56) References Cited

U.S. PATENT DOCUMENTS

| | | |
|---|---|---|
| 7,146,959 B2 | 12/2006 | Thompson et al. |
| 8,816,530 B2 | 8/2014 | Callicoat et al. |
| 9,216,628 B2 | 12/2015 | Self et al. |
| 10,503,232 B2 | 12/2019 | Lota |
| 10,877,537 B1 | 12/2020 | Varughese et al. |
| 11,021,073 B1 * | 6/2021 | Gauthier ................ B60L 53/22 |
| 2016/0043547 A1 | 2/2016 | Patel |
| 2016/0159220 A1 | 6/2016 | Enomoto |

(Continued)

FOREIGN PATENT DOCUMENTS

WO    2022231408 A1    11/2022

*Primary Examiner* — Lincoln D Donovan
*Assistant Examiner* — Alex W Lam
(74) *Attorney, Agent, or Firm* — Frank Lollo; Price Heneveld LLP

(57) ABSTRACT

A power management system for a vehicle includes a power source, switching circuitry, and a first converter electrically interposing the power source and the switching circuitry. The first converter has a first power output threshold. A second converter electrically interposes the power source and the switching circuitry. The second converter has a second power output threshold lower than the first power output threshold. Control circuitry is configured to, in response to a key-off state of the vehicle, control the switching circuitry to supply power to at least one load, compare the power drawn from the second converter by the at least one load to the second power output threshold, and communicate an output to limit the power drawn from the second converter by the at least one load in response to the comparison.

20 Claims, 6 Drawing Sheets

(56) References Cited

U.S. PATENT DOCUMENTS

| | | | |
|---|---|---|---|
| 2017/0134182 A1* | 5/2017 | Davis | H04Q 9/00 |
| 2018/0319287 A1* | 11/2018 | Forssell | H01M 50/204 |
| 2021/0094686 A1* | 4/2021 | Metzner | G08B 13/1965 |
| 2022/0153428 A1* | 5/2022 | Elliott | H02J 4/00 |
| 2022/0332196 A1 | 10/2022 | Christen et al. | |
| 2023/0308612 A1* | 9/2023 | Yanagihara | H04N 7/185 |

* cited by examiner

POWER DISTRIBUTION MANAGEMENT FOR A VEHICLE

FIELD OF THE DISCLOSURE

The present disclosure generally relates to power distribution management for a vehicle and, more particularly, to load shedding optimization in a vehicle environment.

BACKGROUND OF THE DISCLOSURE

Conventional power shedding techniques in a vehicle environment can be limited. For example, power shedding can be automatically instituted without factoring in user preference. An enhanced technique of load shedding for power optimization is needed.

SUMMARY OF THE DISCLOSURE

According to a first aspect of the present disclosure, a power management system for a vehicle includes a power source, switching circuitry electrically coupled with the power source and configured to selectively provide power from the power source to at least one load, a first converter electrically interposing the power source and the switching circuitry and configured to provide the power to the switching circuitry, the first converter having a first power output threshold, a second converter electrically interposing the power source and the switching circuitry and configured to provide the power to the switching circuitry, the second converter having a second power output threshold lower than the first power output threshold, and control circuitry configured to in response to a key-off state of the vehicle, control the switching circuitry to supply the power to the at least one load, compare the power drawn from the second converter by the at least one load to the second power output threshold, and communicate an output to limit the power drawn from the second converter by the at least one load in response to the comparison.

Embodiments of the first aspect of the present disclosure can include any one or a combination of the following features:
- an occupancy detection system configured to detect an occupancy of the vehicle, wherein communication of the output is based further on the occupancy;
- the occupancy detection system includes at least one of a camera, a LiDAR sensor, a RADAR sensor, and a wireless communication network that detects wireless communication devices of occupants of the vehicle;
- the at least one load includes a first load on a first load circuit for a first region of the vehicle and a second load on a second load circuit for a second region of the vehicle, wherein the control circuitry is configured to selectively deactivate at least one of the first load circuit and the second load circuit based on detection of the occupants in at least one of the first region and the second region;
- a position sensor that detects a position of workspace equipment of the vehicle, wherein communication of the output is based further on the position of the workspace equipment;
- the control circuitry is configured to control the switching circuitry to supply the power from the first converter to the at least one load in response to the position of the workspace equipment;
- the workspace equipment includes a desk secured with the vehicle, and wherein the position is a deployed position of the desk;
- a notification device in communication with the control circuitry, wherein the notification device is configured to present an indication to reduce the at least one load in response to the output;
- the notification device is configured to present an option to deactivate a load circuit powering the at least one load in response to the output;
- the notification device is configured to present an option for the at least one load to draw the power from the first converter in response to the output;
- the control circuitry is configured to control the switching circuitry to supply the power from the first converter in response to a selection of the option;
- an active cooling system configured to remove heat from the first converter when the power is drawn from the first converter to the at least one load;
- the second converter does not include an active cooling system configured to remove heat from the second converter when the power is provided to the at least one load from the second converter;
- a power bus electrically coupled with the switching circuitry, wherein the switching circuitry includes a primary switch configured to electrically couple the first converter with the power bus and at least one distribution switch electrically interposing the power bus and the at least one load;
- the switching further comprises a secondary switch electrically interposing the second converter and the power bus; and
- a twelve-volt battery electrically coupled with the power bus via an auxiliary switch, wherein any one of the twelve-volt battery, the first converter, and the second converter are configured to provide electrical power to the power bus based on a state of the switching circuitry.

According to a second aspect of the present disclosure, a power management system for a vehicle includes a power source, a power bus, switching circuitry electrically coupled with the power source and configured to selectively provide power from the power source to at least one load via the power bus, a first converter electrically interposing the power source and the switching circuitry and configured to provide the power to the switching circuitry, the first converter having a first power output threshold, a second converter electrically interposing the power source and the switching circuitry and configured to provide the power to the switching circuitry, the second converter having a second power output threshold lower than the first power output threshold, wherein the switching circuitry includes a primary switch configured to electrically couple the first converter with the power bus and at least one distribution switch electrically interposing the power bus and the at least one load, and control circuitry configured to in response to a key-off state of the vehicle, control the at least one distribution switch to supply the power to the at least one load, compare the power drawn from the second converter by the at least one load to the second power output threshold, and communicate an output to limit the power drawn from the second converter by the at least one load in response to the comparison.

Embodiments of the second aspect of the present disclosure can include any one or a combination of the following features:

an occupancy detection system configured to detect an occupancy of the vehicle, wherein communication of the output is based further on the occupancy; and an active cooling system configured to remove heat from the first converter when the power is drawn from the first converter to the at least one load, wherein the second converter does not include an active cooling system configured to remove heat from the second converter when the power is provided to the at least one load from the second converter.

According to a third aspect of the present disclosure, a power management system for a vehicle includes a power source, switching circuitry electrically coupled with the power source and configured to selectively provide power from the power source to at least one load, a first converter electrically interposing the power source and the switching circuitry and configured to provide power to the switching circuitry, the first converter having a first power output threshold, a second converter electrically interposing the power source and the switching circuitry and configured to provide the power to the switching circuitry, the second converter having a second power output threshold lower than the first power output threshold, an occupancy detection system configured to detect an occupancy of the vehicle, and control circuitry in communication with the occupancy detection system and configured to in response to the key-off state of the vehicle, control the switching circuitry to supply the power to the at least one load, compare the power drawn from the second converter by the at least one load to the second power output threshold, and communicate an output to limit the power drawn from the second converter by the at least one load in response to the comparison and based on the occupancy.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
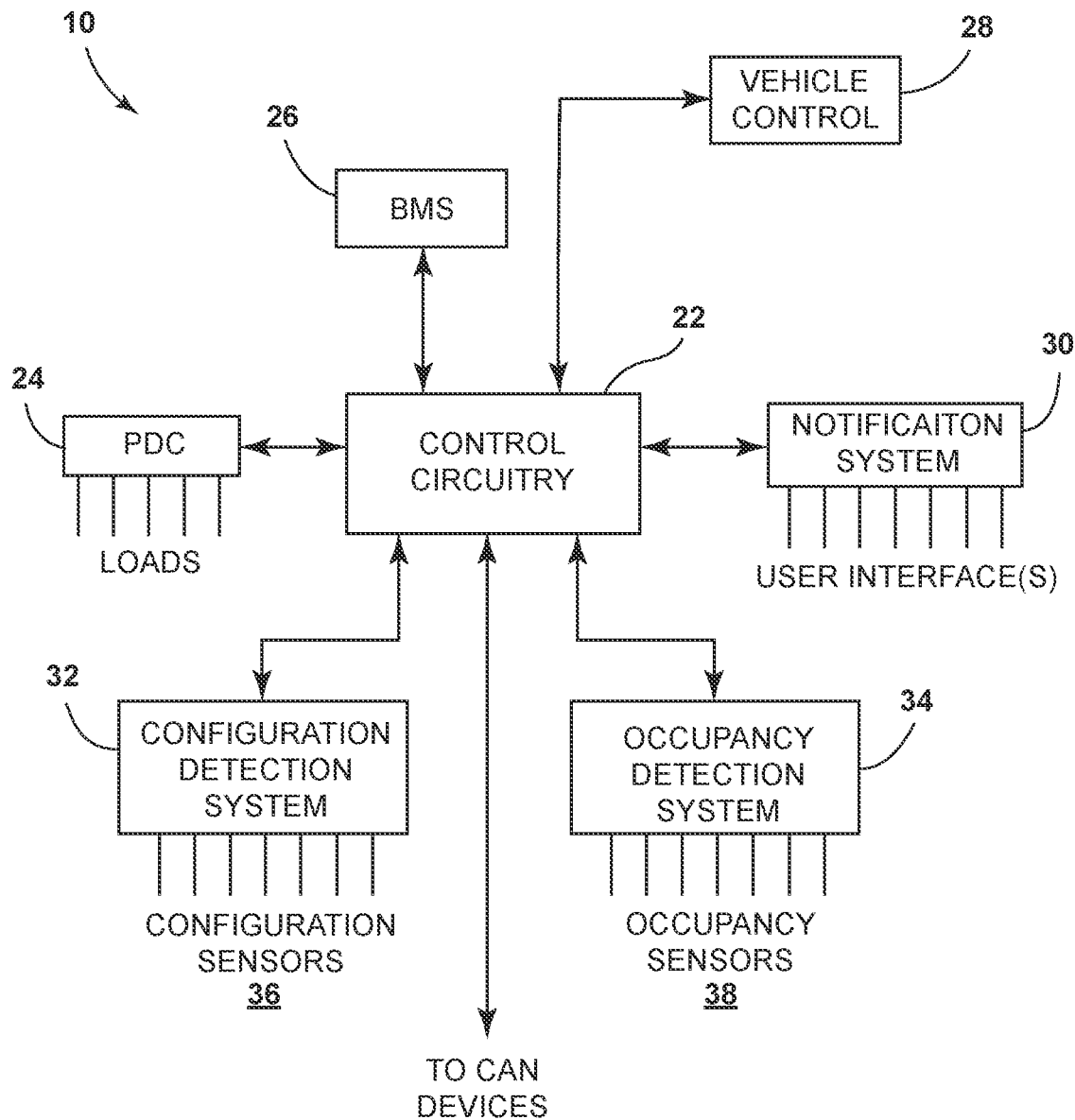
FIG. 1 is a functional block diagram demonstrating control of various components of a power management system for a vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 4:
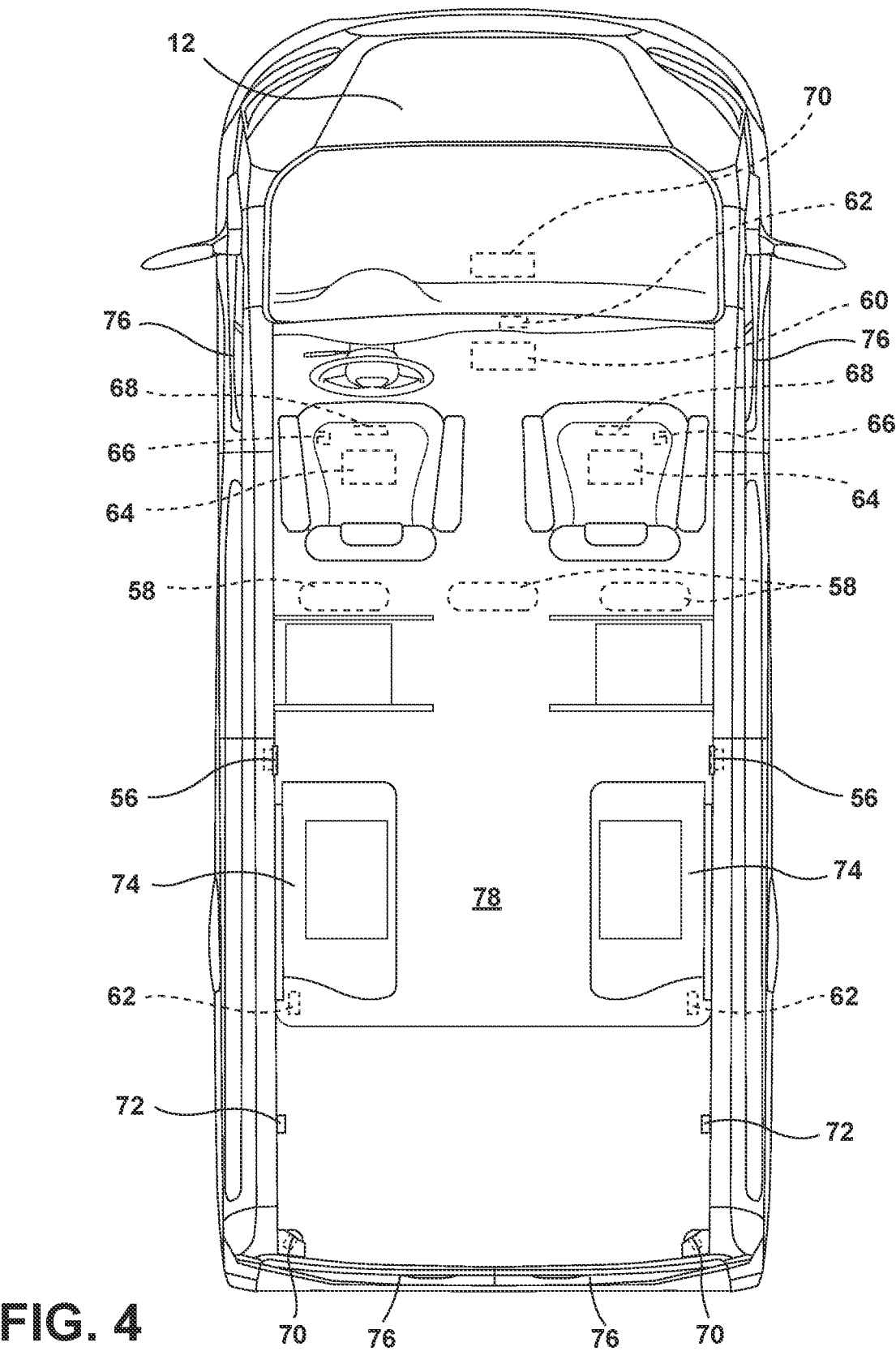
FIG. 4 is a functional plan view of a vehicle incorporating a power management system constructed according to at least one aspect of the present disclosure.

For purposes of description herein, the terms "upper," "lower," "right," "left," "rear," "front," "vertical," "horizontal," and derivatives thereof shall relate to the concepts as oriented in FIG. 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to power distribution management for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Referring generally to FIGS. 1-6C, a power management system is generally designated at 10. In general, the power management system 10 can provide for enhanced power distribution and control for a vehicle 12. The system can further provide for optimized load shedding that can be specific to user preference and controlled by the user. The system can further provide for automatic load shedding preferences to be executed in a workspace environment by utilizing occupancy detection, configuration, detection, or the like to estimate vehicle 12 layout and/or power needs.

With continued reference to FIGS. 1-6C, a power management system 10 for a vehicle 12 includes a power source (e.g., a primary power source 14) and switching circuitry 16 electrically coupled with the power source. The switching circuitry 16 is configured to selectively provide power from the power source to at least one load. The power management system 10 includes a first converter 18 electrically interposing the power source and the switching circuitry 16 and configured to provide the power to the switching circuitry 16. The first converter 18 has a first power output threshold. The power management system 10 includes a second converter 20 electrically interposing the power source and the switching circuitry 16 and configured to provide the power to the switching circuitry 16. The second converter 20 has a second power output threshold lower than the first power output threshold. The power management system 10 includes control circuitry 22 configured to, in response to a key-off state of the vehicle 12, control the switching circuitry 16 to supply the power to the at least one load, compare the power drawn from the second converter 20 by the at least one load to the second power output threshold, and communicate an output to limit the power drawn from the second converter 20 by the at least one load in response to the comparison.

In general, the power management system 10 can utilize load monitoring to limit activation conditions for power conversion components that use more electrical power to operate than other power conversion components. For example, the first converter 18 can have a significantly higher power rating than the second converter 20 and can include active cooling management that draws additional electrical power. Conversely, the second converter 20 can be optimized to run at lower power levels (e.g., under 750 Watts) relative to the first converter 18, which can operate in the kilowatt range. The power management system 10 can implement various strategies and options to limit unnecessary activation of the higher-power conversion components (e.g., the first converter 18) by providing options to the user or automatically shutting of circuits based on circuits that are not in use or likely not in use based on occupancy or configuration of the vehicle 12.

Referring to FIG. 1, the power management system 10 can control electrical power available to a power distribution center (PDC 24), which in-turn controls power availability to one or more loads. The loads can include any electrical load utilized by the vehicle 12, including, but not limited to, interior lights 58, outlets 56 (e.g., universal serial bus (USB) outlets, alternating-current (AC) outlets, direct-current (DC) outlets), display screens 60, heads-up displays (HUDs), or any other electrical load. In some examples, the electrical loads are controlled by the PDC 24. According to the present disclosure include both auxiliary loads and primary loads. For example, the primary loads can include components related to vehicle control, such as powertrain components or other components configured to move the vehicle 12. The auxiliary loads can include lights and/or as previously described and or outlets 56 configured to power consumer-electronics, such as chargers for laptops, tablets, or other mobile devices. In some examples, the auxiliary components can include component adjustment mechanisms, such as motor drives, inflation devices for comfort, auxiliary heating devices for defrosting mirrors, or the like.

The control circuitry 22 described herein can include any number of controllers including any number of processors and memory storing instructions that, when executed by one or more of the processors, cause the one or more controllers to read from and/or write to inputs and outputs, respectively, to control power distribution. For example, the control circuitry 22 can control the PDC 24 to power or remove power from the loads or load circuitry. Such control may be in response to occupancy, configuration, expected load outputs, or any other input that can be read by the control circuitry 22.

With continued reference to FIG. 1, the control circuitry 22 can communicate with a battery management system (BMS 26) to control operation of the first converter 18 and/or the second converter 20 to supply power to the PDC 24. The control circuitry 22 can also be in communication with vehicle control systems 28, such as systems for controlling ignition, powertrain, motion control, or the like. In this way, the control circuitry 22 can detect a key-off position, as well optimize power distribution. By way of example, the control circuitry 22 can control the BMS 26 and/or the PDC 24 differently depending on whether the vehicle 12 is in the key-off state, or the key-on state. Continuing with this example, the control circuitry 22 is further configured to control and receive inputs from a notification system 30 that can include one or more user interfaces of the vehicle 12. The user interfaces can include vehicle display such as mobile devices (e.g., phones, tablets) that are in wireless or wired communication with the control circuitry 22.

With continued reference to FIG. 1, the control circuitry 22 is in communication with a configuration detection system 32 and an occupancy detection system 34 for monitoring a configuration of the vehicle 12 and an occupancy of the vehicle 12, respectively. For example, the configuration detection system 32 can include one or more configuration sensors 36 that are operable to detect positions of adjustable components within the vehicle 12, such as mounted equipment including mirrors or desks 74, and the configuration detection system 32 can classify the configuration of the vehicle 12 in response to information from the configuration sensors 36. The occupancy detection system 34 can include occupancy sensors 38, which may be the same or different from the configuration sensors 36, that are configured to detect occupancy of the vehicle 12, such as a number of occupants, positions of occupants in a cabin of the vehicle 12 or another space in the vehicle 12, and/or other occupancy conditions.

The occupancy sensors 38 and/or the configuration sensors 36 can includes any type of sensor, such as proximity sensors, cameras 70, LiDAR sensors, RADAR sensors, mechanical switches, or other sensors. In some examples, the occupancy sensors 38 and the configuration sensors 36 can include nodes on a communication network for the vehicle 12. The communication network can incorporate any wireless or wired communication protocol, such as Wi-Fi®, Bluetooth®, ZigBee, Z-Wave, Ethernet, CAN, USB, or any communication network that can detect mobile devices or built-in devices (e.g., mounted touchscreens in the vehicle 12) corresponding to occupants. By way of example, a wireless network can be configured to pair with or track mobile devices in the vehicle 12, including relative positions of the mobile devices and/or identities stored in the mobile devices. In this way, the configuration sensor and/or the occupancy sensors 38 can be nodes on the network or a local network interface that classifies the position of the mobile devices.

In some examples, power being drawn from the power distribution center can be monitored to determine configuration or occupancy (e.g., loads corresponding to vehicle 12 regions for occupants, such as front cabin, rear cabin, left or right sides, etc.). Continuing with the above examples, an occupant may enter the vehicle 12 and power a laptop from a USB outlet 56 in a first location of the vehicle 12. In response to power being drawn from a particular circuit, the control circuitry 22 can determine that an occupant is likely in a specific location in the vehicle 12. Based on this information, the control circuitry 22 can control the PDC 24 and/or the BMS 26 to optimize power-shedding suggestions and/or implementations. As will be described further herein, such power-shedding options can be presented via the notification system 30 in the form of audio or visual indications at a user interface, thereby allowing the user control over power shedding options. In other examples, the power shedding is automatically implemented.

Figure 2:
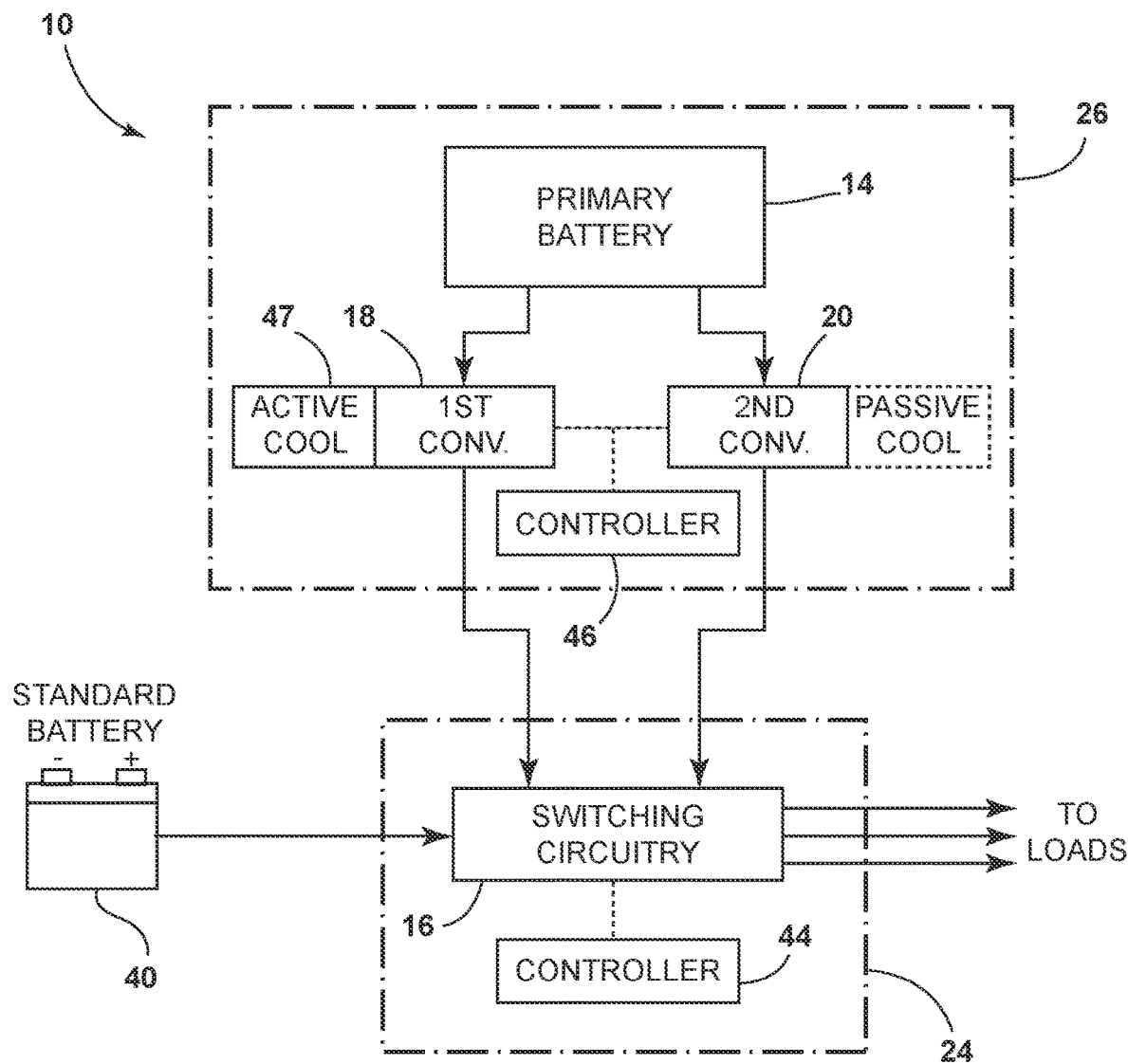
FIG. 2 is a functional block diagram demonstrating power control for a power management system for a vehicle.

Referring now to FIG. 2, the BMS 26 can include the primary power source 14, which can include one or more lithium batteries configured to operate at a high power load. For example, the primary power source 14 can power driving components of the vehicle 12, such as motors for motion control and/or features related to autonomous vehicle control, electric vehicle operation, hybrid vehicle operation, etc. The primary power source 14 can include one or more electrochemical cells configured to power an electric or hybrid vehicle.

The primary power source 14 can provide power to the first converter 18 and the second converter 20. One or both of the first and second converters 18, 20 can be disposed outside of a housing of the BMS 26 or withing the BMS 26, as illustrated. Each of the first and second converters 18, 20 are configured to output one or more operating voltages. For example, the second converter 20 can output less voltage than the voltage output of the first converter 18. In this way, when both the first converter 18 and the second converter 20 are activated, power can be drawn via the first converter 18 rather than the second converter 20. In some examples, the first converter 18 and the second converter 20 can output between 9 and 15 volts at direct-current (VDC). In some examples, a common operating voltage is provided between 10 VDC and 14 VDC. In still other examples, the operating voltage is between 11.5 VDC and 14 VDC. In one example, the first converter 18 is configured to output a power at 13.5 VDC and the secondary converter is configured to output power at 13 VDC. In general, the first converter 18 can have a first power output threshold greater than a second power output threshold of the second converter 20.

For example, the primary power source 14 can be configured to provide power at 400 VDC to the first and second converters 18, 20. Each converter can be a protected DC-DC converter. The first converter 18 can be configured to output 280 amperes continuous and 336 amperes peak. Accordingly, the power from the first converter 18 can be in the range of 3 kW-5 kW. The second converter 20 can be configured to output 750 W (continuous). Accordingly, as the current drawn from the second converter 20 causes the power to approach a power threshold, the power management system 10 can take automatic power transfer action or recommend load shedding to limit operation of the first converter 18.

Still referring to FIG. 2, the power management system 10 can include a secondary power source 40 that is configured to provide power to the PDC 24 in non-standard operating conditions. For example, the second power source can be used when the primary power source 14 is inoperable or inaccessible to the PDC 24. Thus, the first converter 18, the second converter 20, and the secondary power source 40 can provide power to the PDC 24 at an operating voltage. The secondary power source 40 can include a lead-acid or lithium battery that provides back-up power to the PDC 24. For example, the secondary power source 40 can be a classical automotive 12 VDC battery.

With continued reference to FIG. 2, the PDC 24 can include the switching circuitry 16 that controls which power source powers the one or more loads. The switching circuitry 16 can also control one or more load circuits 42. In this way, the switching circuitry 16 can control power input to the PDC 24 and power output from the PDC 24. As previously described, the control circuitry 22 can include one more controllers that communicate with one another to perform the steps of monitoring and controlling power distribution for the power management system 10. In the present example, the control circuitry 22 includes a first controller 44 corresponding to the PDC 24 and a second controller 46 for the BMS 26. It is contemplated that, in some examples, a common controller can be configured to control both the BMS 26 and the PDC 24. Other controllers may also, or alternatively, be provided to control the PDC 24 and the BMS 26. In this example, the second controller 46 can be configured to control activation of one or both of the first converter 18 and the second converter 20, as well as power output from the primary power source 14. The first controller 44 can be configured to control the switching circuitry 16 based on power drawn from one or more of the load circuits 42 and/or power drawn from the first converter 18, the second converter 20, or the secondary power source 40.

Figure 3:
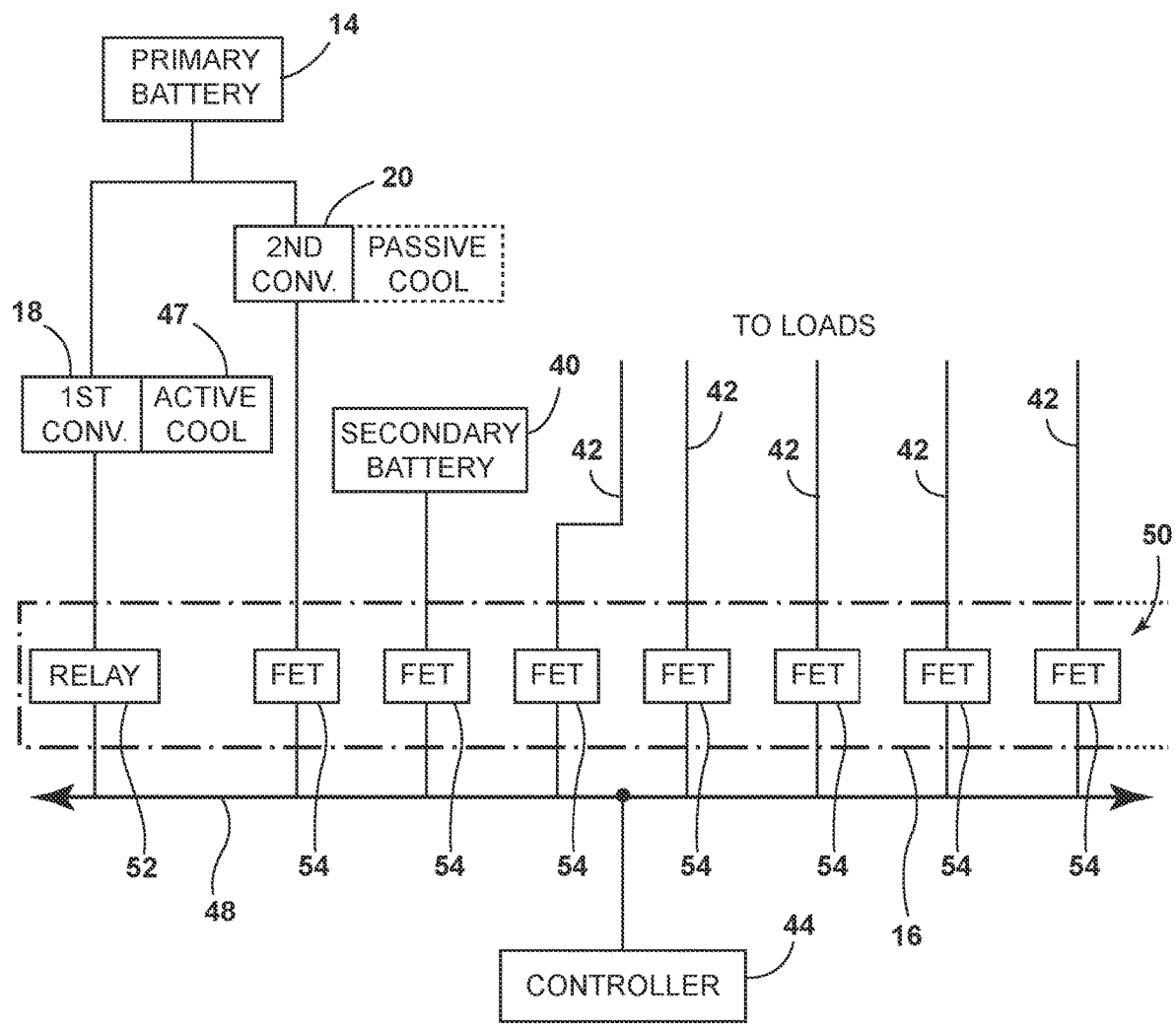
FIG. 3 is an electrical schematic of a power distribution center demonstrating at least a portion of switching circuitry of the power distribution center.

Referring now to FIGS. 2 and 3, the first converter 18 can be configured to be cooled actively, while the second converter 20 can be configured to be cooled passively. For example, an active cooling system 47 can be provided for cooling the first converter 18 when the first converter 18 is in use. The active cooling system 47 can include one or more blower fans, heat exchangers, heat pumps (utilizing coolant or refrigerant), or any other active cooling device to remove heat form the first converter 18 and/or the BMS 26. Because the first converter 18 is configured for higher-power operations relative to the second converter 20, the active cooling system 47 is used to cool the electronics providing the power to the PDC 24. The active cooling system 47 can be powered by power from the first converter 18. Thus, the first converter 18 can be less efficient when providing power at lower power draws that still exceed the power output by the second converter 20. Because the second converter 20 can include passive cooling (integrated blower fan, heat sinks, etc.) and omit an active cooling system 47, operation of the second converter 20 can be more efficient in low-power draw conditions.

Referring to FIG. 3, the PDC 24 can include a power bus 48 that receives electrical power from at least one of the primary power source 14 and the secondary power source 40 at an operational voltage (e.g., 13 VDC). In particular, the switching circuitry 16 can include a plurality of switches 50, with a switch for each circuit powered by or powering the power bus 48. The switches 50 can include an electrical switch, such as a transistor, a relay, a contactor, or any other type of switch that can be controlled by the control circuitry 22. In the present example, a high-power contactor relay 52 electrically interposes the first converter 18 and the power bus 48, and field-effect transistors (FETs 54) interpose each of the second converter 20, the secondary power source 40, and the load circuits 42. It is contemplated that any switch may be used. However in the present example, the contactor relay 52 can be configured to control higher current levels that the FETs 54, and is therefore provided between the first converter 18 and the power bus 48. As previously described, greater power levels may be provided by the first converter 18 than provided by the second converter 20.

When a switch (e.g., at least one distribution switch) is activated for one or more of the load circuits 42, loads electrically connected to that load circuit is electrically coupled with the power bus 48. Depending on which switches 50 are activated, power will be provided from the first converter 18 (via a primary switch), the second converter 20 (via a secondary switch), or the secondary power source 40 (via an auxiliary switch. The switches 50 can be controlled via any portion of the control circuitry 22, though in the present example, the first controller 44 can control the switches 50. The control circuitry 22 controls the switching circuitry 16 according to one or more algorithms and methods to limit activation of the first converter 18 and optimize user experience using occupancy and configuration detection, as will be described below.

Figure 5:
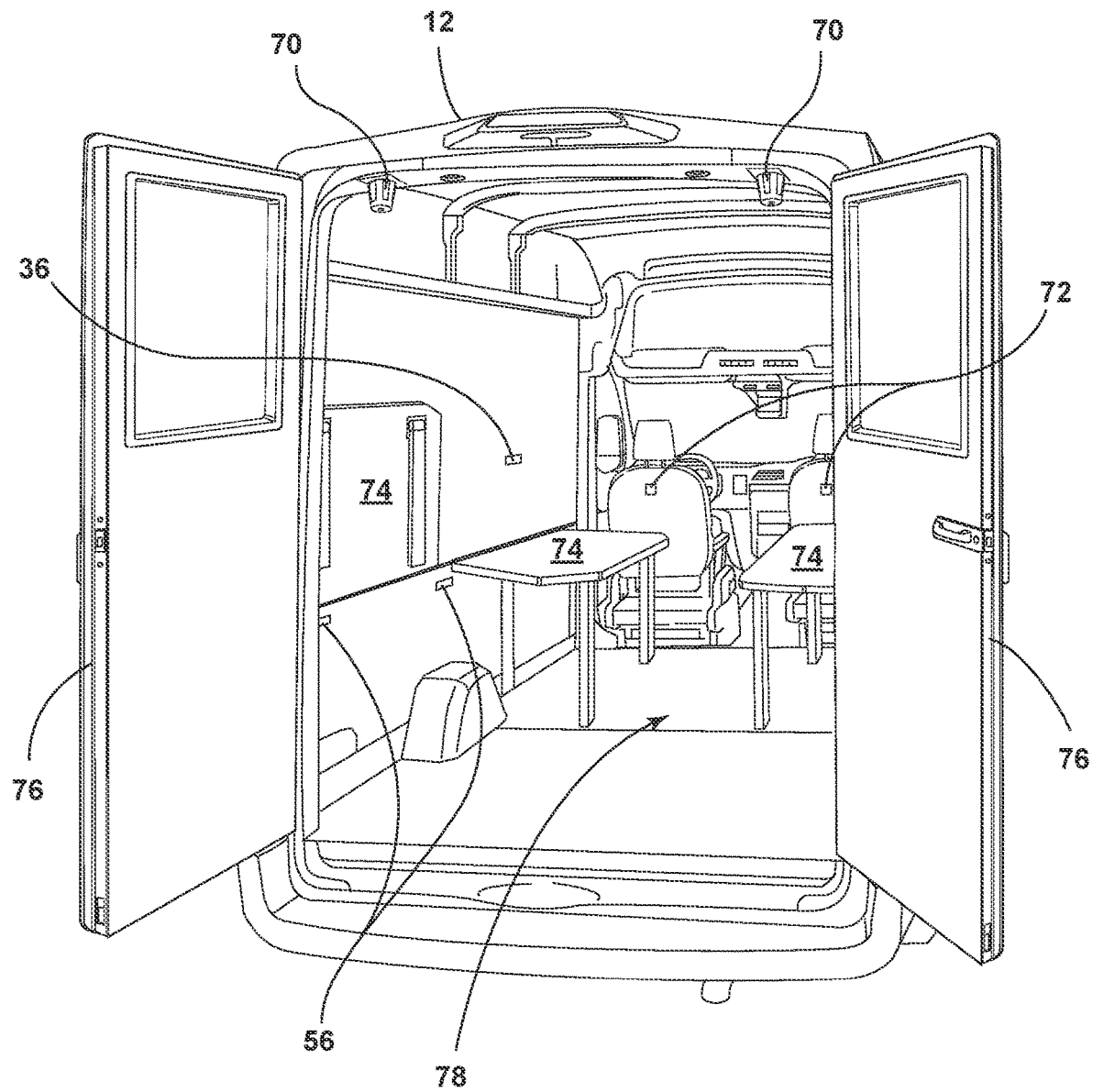
FIG. 5 is a perspective view of a vehicle incorporating a power management system configured to manage power based on configurations of the vehicle.

Referring now to FIGS. 4 and 5, the power management system 10 can selectively provide power to various electrical components (e.g., load circuits 42) in the vehicle 12. In the present example, the load circuits 42 include outlets 56, interior lighting 58, screens 60, USB power stations 62, adjusters (e.g., bladders 64, motors 66), heaters 68, and the like are controlled by the PDC 24 via the switching circuitry 16. Current drawn by these loads (e.g., mobile devices plugged into outlets 56, interior lights) can be monitored by the power management system 10 using any number of methods, such as current detectors (ammeters), voltage dividers, voltmeters, or the like. This electrical information can be monitored by the control circuitry 22. In response to this electrical information, the control circuitry 22 can communicate one or more signals or omit one or more signals to the switching circuitry 16 to disconnect one or more of the load circuits 42 or disconnect or connect the converters or the secondary power source 40.

As demonstrated in FIGS. 4 and 5, based on which load circuits 42 are in use, information from the occupancy detection system 34, and/or information from the configuration detection system 32, the control circuitry 22 control the switching circuitry 16. By way of example, cameras 70, proximity sensors 72, the wireless communication network previously described, or any other configuration sensor or occupancy sensor can communicate occupancy and/or configuration data to the control circuitry 22. The data can include a number and estimated position of occupants and/or positions of equipment in the vehicle 12 (mirrors, desks 74, doors 76, etc.). In some examples, the configuration sensors 36 and/or the occupancy sensors 38 include physical switches 50 that engaged or disengaged by equipment in the vehicle 12. For example, a button may be physically engaged by the desk 74 when the desk 74 is stowed and disengaged when the desk 74 is deployed. By using the occupancy and/or configuration data, the control circuitry 22 can implement a power savings plan that does not limit user experience.

By way of example, and with reference to FIG. 5, the power management system 10 is employed in an office environment 78. In this example, the vehicle 12 is in a key-off state and one or more of the desks 74 is deployed. A chargeable device (e.g., a laptop computer) can be charged via connection with an outlet 56 near the deployed desk 74. Interior lights in the office environment 78 are activated. However, no occupants are detected based on the occupancy sensors 38. For example, none of cameras 70, light detection and ranging (LiDAR) sensors, radio detection and ranging (RADAR) sensors, or the like are detecting occupants. Based on the null occupancy condition in a rear of the vehicle 12, the control circuitry 22 can automatically deactivate, via control of one or more of the FETs 54, the interior lights in the office environment 78 and/or the output that can be used by the chargeable device. However, if occupancy is detected in a front cabin of the vehicle 12, load circuits 42 corresponding to use of the front cabin can remain activated. In some examples, rather than automatically deactivating one or more of the load circuits 42 for the office environment 78, the control circuitry 22 communicates an indication to a mobile device of a user or an in-cabin user interface that power shedding can be implemented. Stated differently, the power management system 10 may present options to the user to deactivate one or more of the load circuits 42.

Figure 6A:
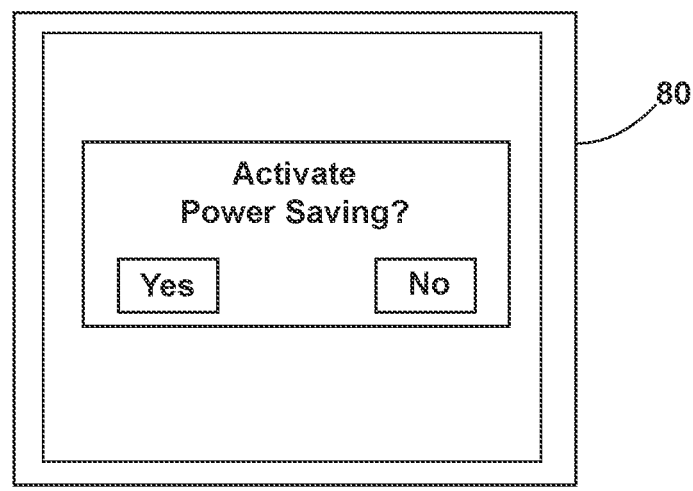
FIG. 6A, is a front plan view of a notification device configured to present one or more load shedding options according to a first aspect.
Figure 6B:
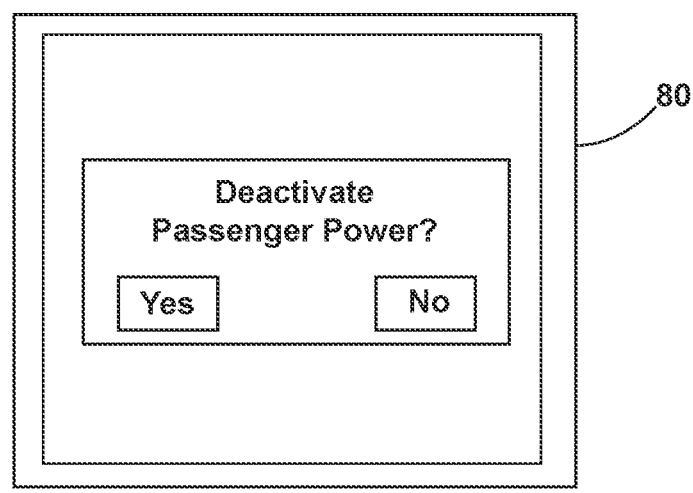
FIG. 6B, is a front plan view of a notification device configured to present one or more load shedding options according to a first aspect.
Figure 6C:
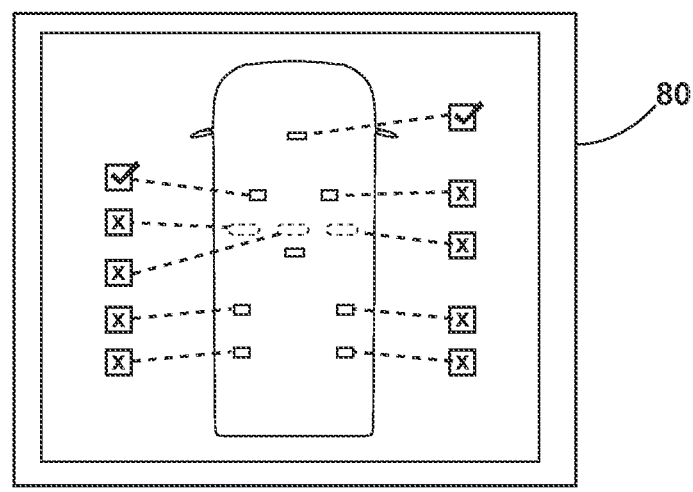
FIG. 6C, is a front plan view of a notification device configured to present one or more load shedding options according to a first aspect.

Referring now to FIGS. 6A-6C, various examples of visual options presented to a user via a notification device 80 can be implemented based on the information from the control circuitry 22. While visual notifications are presented, it is contemplated that the notification device 80 can include audio speakers or another mechanism for indicating power shedding options. With particular reference to FIG. 6A, the notification can be configured to present an option to implement power shedding, or an indication to reduce at least one load, in response to an output from the control circuitry 22. In another example (FIG. 6B), a specified option based on the occupancy data, configuration data, and/or power consumption data is presented. In this example, based on the information of usage of the cabin of the vehicle 12, there is no front passenger, and thus, no need to power electrical loads corresponding to the front passenger. Upon selection of "YES" in FIG. 6B, the control circuitry 22 can deactivate lighting 58, power outlets 56, screens 60, or the like corresponding to the front passenger.

With reference to FIG. 6C, the notification device 80 can display a map of the vehicle 12 indicating load circuits 42 that can be deactivated by the user. For example, upon detection of current draw from the second converter 20 exceeding a power threshold and occupancy, configuration, or power usage data gathered by the control circuitry 22, the notification device 80 can recommend power shedding options that can be confirmed by the user based on a map of the vehicle 12. It is contemplated that the examples shown and described with reference to FIGS. 6A-6C are non-limiting, and other notification methods can be implemented without departing from the concepts herein.

In general, the present power management system 10 can enhance user experience and optimize power usage simultaneously by monitoring occupancy and/or configuration of the vehicle 12 and/or tracking power being drawn or expected to be drawn from the PDC 24.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or endpoint of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A power management system for a vehicle, comprising:
a power source;
switching circuitry electrically coupled with the power source and configured to selectively provide power from the power source to at least one load;
a first converter electrically interposing the power source and the switching circuitry and configured to provide the power to the switching circuitry, the first converter having a first power output threshold;
a second converter electrically interposing the power source and the switching circuitry and configured to provide the power to the switching circuitry, the second converter having a second power output threshold lower than the first power output threshold; and
control circuitry configured to:
in response to a key-off state of the vehicle, control the switching circuitry to supply the power to the at least one load;
compare the power drawn from the second converter by the at least one load to the second power output threshold; and
communicate an output to limit the power drawn from the second converter by the at least one load in response to the comparison.

2. The power management system of claim 1, further comprising:
an occupancy detection system configured to detect an occupancy of the vehicle, wherein communication of the output is based further on the occupancy.

3. The power management system of claim 2, wherein the occupancy detection system includes at least one of a camera, a LiDAR sensor, a RADAR sensor, and a wireless communication network that detects wireless communication devices of occupants of the vehicle.

4. The power management system of claim 2, wherein the at least one load includes a first load on a first load circuit for a first region of the vehicle and a second load on a second load circuit for a second region of the vehicle, wherein the control circuitry is configured to selectively deactivate at least one of the first load circuit and the second load circuit based on detection of the occupants in at least one of the first region and the second region.

5. The power management system of claim 1, further comprising:
a position sensor that detects a position of workspace equipment of the vehicle, wherein communication of the output is based further on the position of the workspace equipment.

6. The power management system of claim 5, wherein the control circuitry is configured to control the switching circuitry to supply the power from the first converter to the at least one load in response to the position of the workspace equipment.

7. The power management system of claim 6, wherein the workspace equipment includes a desk secured with the vehicle, and wherein the position is a deployed position of the desk.

8. The power management system of claim 1, further comprising:
a notification device in communication with the control circuitry, wherein the notification device is configured to present an indication to reduce the at least one load in response to the output.

9. The power management system of claim 8, wherein the notification device is configured to present an option to deactivate a load circuit powering the at least one load in response to the output.

10. The power management system of claim 8, wherein the notification device is configured to present an option for the at least one load to draw the power from the first converter in response to the output.

11. The power management system of claim 10, wherein the control circuitry is configured to control the switching circuitry to supply the power from the first converter in response to a selection of the option.

12. The power management system of claim 1, further comprising:
an active cooling system configured to remove heat from the first converter when the power is drawn from the first converter to the at least one load.

13. The power management system of claim 12, wherein the second converter does not include an active cooling system configured to remove heat from the second converter when the power is provided to the at least one load from the second converter.

14. The power management system of claim 1, further comprising:
a power bus electrically coupled with the switching circuitry, wherein the switching circuitry includes a primary switch configured to electrically couple the first converter with the power bus and at least one distribution switch electrically interposing the power bus and the at least one load.

15. The power management system of claim 14, wherein the switching further comprises a secondary switch electrically interposing the second converter and the power bus.

16. The power management system of claim 14, further comprising:
a twelve-volt battery electrically coupled with the power bus via an auxiliary switch, wherein any one of the twelve-volt battery, the first converter, and the second converter are configured to provide electrical power to the power bus based on a state of the switching circuitry.

17. A power management system for a vehicle, comprising:
- a power source;
- a power bus;
- switching circuitry electrically coupled with the power source and configured to selectively provide power from the power source to at least one load via the power bus;
- a first converter electrically interposing the power source and the switching circuitry and configured to provide the power to the switching circuitry, the first converter having a first power output threshold;
- a second converter electrically interposing the power source and the switching circuitry and configured to provide the power to the switching circuitry, the second converter having a second power output threshold lower than the first power output threshold, wherein the switching circuitry includes a primary switch configured to electrically couple the first converter with the power bus and at least one distribution switch electrically interposing the power bus and the at least one load;
- an active cooling system configured to remove heat from the first converter when the power is drawn from the first converter to the at least one load, wherein the second converter does not include an active cooling system configured to remove heat from the second converter when the power is provided to the at least one load from the second converter; and
- control circuitry configured to:
  - in response to a key-off state of the vehicle, control the at least one distribution switch to supply the power to the at least one load;
  - compare the power drawn from the second converter by the at least one load to the second power output threshold; and
  - communicate an output to limit the power drawn from the second converter by the at least one load in response to the comparison.

18. The power management system of claim 17, further comprising:
- an occupancy detection system configured to detect an occupancy of the vehicle, wherein communication of the output is based further on the occupancy.

19. A power management system for a vehicle, comprising:
- a power source;
- switching circuitry electrically coupled with the power source and configured to selectively provide power from the power source to at least one load;
- a first converter electrically interposing the power source and the switching circuitry and configured to provide power to the switching circuitry, the first converter having a first power output threshold;
- a second converter electrically interposing the power source and the switching circuitry and configured to provide the power to the switching circuitry, the second converter having a second power output threshold lower than the first power output threshold;
- an occupancy detection system configured to detect an occupancy of the vehicle; and
- control circuitry in communication with the occupancy detection system and configured to:
  - in response to the key-off state of the vehicle, control the switching circuitry to supply the power to the at least one load;
  - compare the power drawn from the second converter by the at least one load to the second power output threshold; and
  - communicate an output to limit the power drawn from the second converter by the at least one load in response to the comparison and based on the occupancy.

20. The power management system of claim 19, further comprising:
- an active cooling system configured to remove heat from the first converter when the power is drawn from the first converter to the at least one load.

* * * * *